(12) United States Patent
Grimm

(10) Patent No.: US 10,466,058 B2
(45) Date of Patent: Nov. 5, 2019

(54) NAVIGATION FOR VEHICLES

(71) Applicant: Gestalt Systems GmbH, Karlsruhe (DE)

(72) Inventor: Henning Grimm, Karlsruhe (DE)

(73) Assignee: Gestalt Systems GmbH, Karlsruhe (DE)

(*) Notice: Subject to any disclaimer, the term of this patent is extended or adjusted under 35 U.S.C. 154(b) by 210 days.

(21) Appl. No.: 15/848,765

(22) Filed: Dec. 20, 2017

(65) Prior Publication Data

US 2018/0180428 A1    Jun. 28, 2018

(30) Foreign Application Priority Data

Dec. 22, 2016  (EP) .................................... 16206179

(51) Int. Cl.
*G01C 21/34* (2006.01)
*G01C 21/20* (2006.01)
*G08G 9/02* (2006.01)

(52) U.S. Cl.
CPC ......... *G01C 21/3446* (2013.01); *G01C 21/20* (2013.01); *G01C 21/343* (2013.01); *G08G 9/02* (2013.01)

(58) Field of Classification Search
CPC .. G01C 21/3446; G01C 21/20; G01C 21/343; G08G 9/02
See application file for complete search history.

(56) References Cited

U.S. PATENT DOCUMENTS

| 5,204,817 A * | 4/1993 | Yoshida ............. G01C 21/3446 283/34 |
| 6,622,085 B1 * | 9/2003 | Amita ................... G01C 21/32 340/990 |
| 8,996,224 B1 * | 3/2015 | Herbach .............. G05D 1/0011 180/116 |
| 9,173,069 B2 * | 10/2015 | Li ........................ G01C 21/206 |

(Continued)

FOREIGN PATENT DOCUMENTS

| EP | 2428771 A1 | 3/2012 |
| EP | 2863177 A1 | 4/2015 |

OTHER PUBLICATIONS

European Search Report for European Application No. 16206179.0, dated Jun. 20, 2017, 8 pages.

*Primary Examiner* — Calvin Cheung
(74) *Attorney, Agent, or Firm* — Brake Hughes Bellermann LLP

(57) ABSTRACT

A computer system, computer-implemented method and computer program product are provided for enabling parallel processing of determining collision-free paths for a vehicle to navigate from a start location to a target location. The system receives representations of the start location (SL), the target location (TL) and one or more polygonal representations of one or more potential collision objects and initializes a representation of the vehicle with the start location (SL) as current location (CL), and with a list of targets (LOT) comprising the received target location (TL) as most recent target location. Then it iteratively constructs a graph of collision-free path segments by determining whether a collision object is located on a direct connection between the current location and the most recent target location in the list of targets, and repeating a series of steps for each vehicle representation.

20 Claims, 8 Drawing Sheets

(56) References Cited

U.S. PATENT DOCUMENTS

| | | | |
|---|---|---|---|
| 9,823,079 B2* | 11/2017 | Marusco | G01C 21/206 |
| 9,836,980 B2* | 12/2017 | Sommer | G08G 9/02 |
| 9,841,285 B2* | 12/2017 | Chau | G01C 21/206 |
| 2001/0023390 A1* | 9/2001 | Gia | G01C 21/00 701/301 |
| 2002/0183922 A1* | 12/2002 | Tomasi | G01C 21/20 701/533 |
| 2013/0218465 A1* | 8/2013 | Strassenburg-Kleciak | G01C 21/3461 701/533 |

* cited by examiner

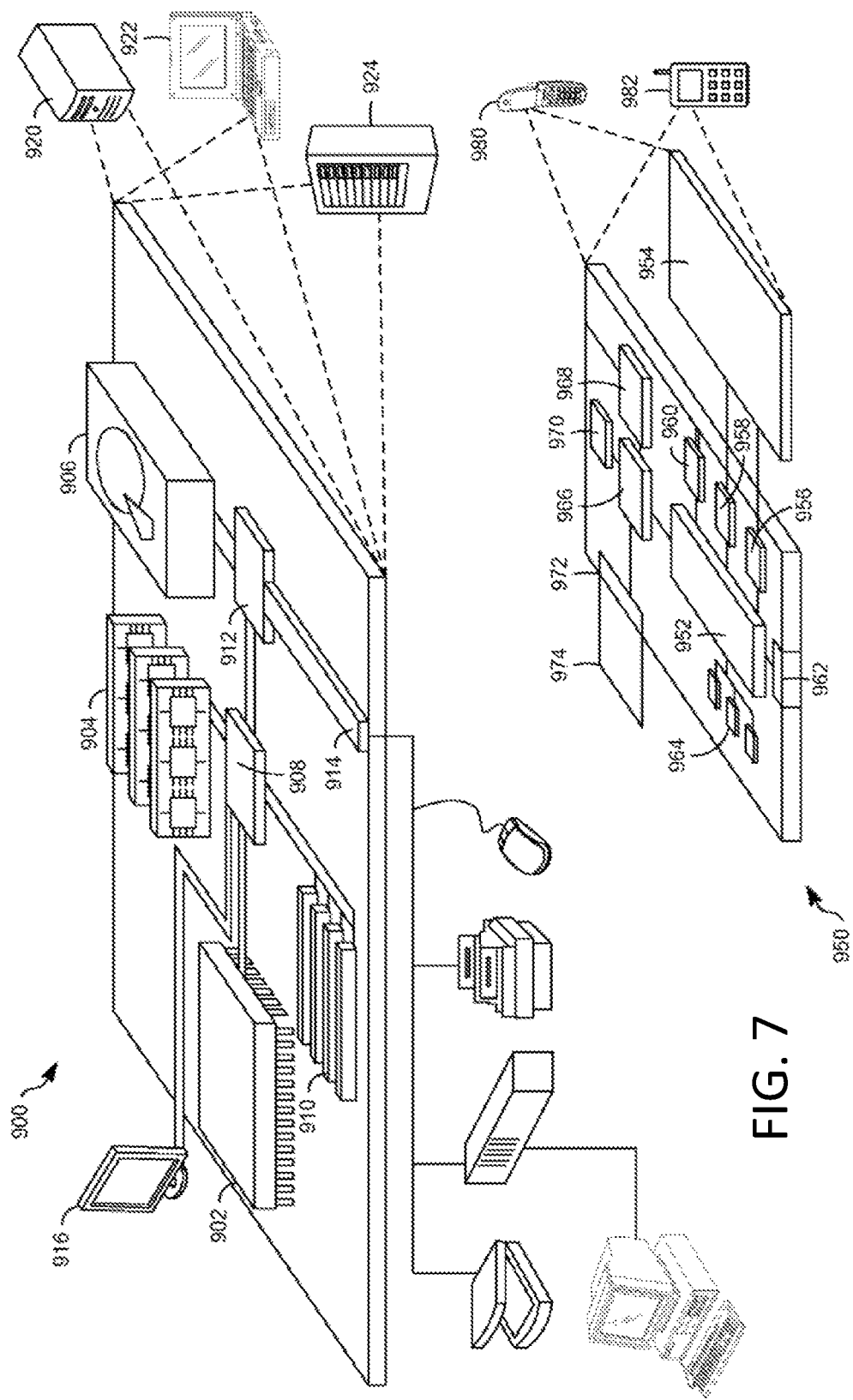

NAVIGATION FOR VEHICLES

CROSS REFERENCE TO RELATED APPLICATION

This application claims priority to, and is a continuation of, EP16206179, filed on Dec. 22, 2016 and entitled "NAVIGATION FOR VEHICLES" the entirety of which is hereby incorporated by reference.

TECHNICAL FIELD

The present disclosure generally relates to systems for navigation of vehicles, and more particularly, relates to methods, computer program products and systems for real time route adjustment.

BACKGROUND

Route computation and optimization for vehicles, such as for example, water vehicles (e.g., ships, boats, hovercrafts, vessels, submarines, etc.), airborne vehicles (e.g., drones), or robots, becomes complex when the vehicle is supposed to use a route optimized towards a particular set of goals between a start location and a target location, and when, between the start and target location, one or more collision objects (or collision areas) exist. It is to be noted that water/airborne vehicles or robots are primarily not bound by any boundaries from predefined route options such as roads or rails. Rather, such vehicles are mostly free to use any direction on a surface or within a given height band. This increases the risk to run into collision objects. Such collision objects may be of a static type (e.g., landmass such as islands, coastal areas or areas with low water depth, mountains, lakes, etc.), or they may be of a dynamic type (e.g., areas with strong water/air currents or, more generally, difficult weather conditions that should be avoided, or areas to that exposure should be minimized).

Typically, such collision objects are represented by or approximated as polygonal representations modeling the shapes and locations of the respective collision objects on a map. This is sometimes called a polygonal environment. In addition, routes are typically computed as sequences of waypoints, which can be used to draw polygonal lines which may be smoothened by the computation of so-called splines or to draw sequences of great circle arcs to describe paths on a spherical shape.

When trying to compute a route under particular optimization constraints (e.g., land masses, etc.) and one or more target functions (e.g., as short as possible or as fast as possible), a mathematical optimization problem in a continuous environment has an infinite number of potential solutions which significantly impedes the selection of an appropriate route. The lack of knowledge about the number of intermediate steps, the possibly non-convex properties of the collision objects and, for example, the non-convex properties in the context of fuel consumption provide substantial challenges for the route computation. In cases of dynamic environments (non-static collision objects), a mathematically optimal solution is impractical and even with state-of the art computing power, not feasible.

Therefore, prior art solutions for solvable route computation in polygonal environment were suggested. These prior art solutions include cell decomposition, Voronoi diagrams, probability roadmaps, A star, and visibility graphs. However, because of discretization steps, some prior art solutions suffer from information loss inherent to the used algorithms which may prevent the computation of an optimal route. This leads to a situation where route computation cannot be performed in scenarios with quasi real-time computation requirement, and further consumes huge amounts of memory space. For example, in situations where a dynamic collision object needs to be avoided, it is advantageous to adjust the route of the ship very quickly because of the inertia of water vehicles. Further, it is desirable to perform such computations on mobile devices, such as smart phones or tablet computers with limited memory capacity and computing power. Hence, there is a need for providing a route computation systems and methods without information loss for highly accurate route computation which can be performed by low performance computing devices, with quasi-real-time response behavior.

SUMMARY

The systems and methods described herein provide an accurate route computation system that can perform route computations on a low performance computing device without information loss. For instance, a computer-implemented method is described for enabling parallel processing of determining collision-free paths for a vehicle to navigate from a start location to a target location. A corresponding computer program product and a computer system which is configured to run the computer program for executing said method in accordance with the independent claims as defined herein. In the following description, the example of water vehicle navigation is used to illustrate embodiments of the present disclosure. A person skilled in the art can easily adopt the disclosed principles to other types of vehicles such as airborne vehicles navigating within a given height band or robotic vehicles navigating on ground (e.g., a lawn mower robot).

The computer-implemented method discloses a way to construct a data structure (a graph including collision-free path segments) in such a way that parallel processing is enabled for determining collision-free paths for a water vehicle to navigate from a start location to a target location. At the same time, the size of the graph to provide collision-free route options is significantly smaller than in the above mentioned prior art approaches. The disclosed approach allows to run (e.g., execute) the method on low performance computing devices, such as for example, smart phones of tablet computers.

The method starts with receiving representations of the start location, the target location and one or more polygonal representations of one or more potential collision objects. A potential collision object is any object which enforces a deviation of a vehicle if the vehicle needs to reach a location beyond the potential collision object without colliding with said object. The start location corresponds to the location where the vehicle is located at the beginning when starting the navigation. The target location is the final location to be reached by the vehicle. The polygonal representations represent the shape of potential collision objects. Collision objects may be static (e.g., a polygon representing a static collision object may model a coastal region of an island or a continent), or they may be dynamic in that the location and/or shape of the collision object may vary over time. Example of dynamic collision objects are other water vehicles, sea currents, or weather phenomena (e.g., hurricane, foggy area, etc.). The start/target locations may be received from a user via a human user interface or from another computer system via a machine-machine interface.

For constructing said graph data structure, an initialization component initializes at least one representation of the vehicle. After initialization, the at least one vehicle representation includes the received start location as its current location, and further includes a list of targets comprising the received target location.

The vehicle representation is also referred to as particle in the following description. In other words, after the initialization, the at least one vehicle representation exists at the start location with the target location as the final destination for the vehicle. It is to be noted that the terms start location, current location and target location correspond to real-world locations but are used herein as describing the representations of such real-world locations in a graph. The term collision object also relates to real-world objects or phenomena. The representations of collision objects are polygons. Particular nodes of such polygons can become parts of said graph. However, the term collision object sometimes is also used in relation to said polygonal representation. For a person skilled in the art, it is clear from the context when the term collision object is used in its meaning of the respective representation. For example, a phrase such as "a collision object is located between a first and second location" means that in the real world there is a real collision object between the respective real locations. At the same time, it is to be understood that in the route computation system a polygonal representation of the collision object is between the respective nodes representing the first and second locations.

A graph generator iteratively constructs a graph of collision-free path segments (graph data structure) by determining whether a collision object is located on a direct connection between the current location of the vehicle and the most recent target location in the list of targets associated with the vehicle. "Current location" or "current target location" as used herein refer to respective location representations in the current computational iteration cycle of the iterative graph construction. This iterative graph construction repeats for each vehicle representation the following steps until the current target location equals the received target location (i.e., the vehicle representation has reached its final destination), or until another termination condition is fulfilled:

If the direct connection between the current location of the vehicle and the most recent target location is collision-free, the corresponding path segment (i.e. the direct connection) is saved as an edge of the graph. For example, right after the initialization only the received target location(s) is/are included in the list of targets. That is, in the first iteration, the most recent target location corresponds to the target location. Then, the graph generator sets (selects) for the next iteration the most recent target location as new current location and removes the most recent target location from the list of targets.

Else (i.e. the direct connection is not collision-free), the graph generator identifies a plurality of reachable nodes wherein the nodes are defined based on local extrema relative to the deviation angle to the left or to the right from the direct connection between the current location and the most recent target location on one or more polygonal representations intersecting with the direct connection. For example, a reachable node is based on an identified local extrema node if it corresponds to the local extremum itself or if it can be derived from the local extrema. For example, the reachable node can be defined as a location in the vicinity of the local extremum. For example, a safety distance may be added to the local extrema to ensure that the reachable node is associated with water of sufficient depth. A reachable node can be any node in the neighborhood of the local extremum which is not hidden by at least a part of the respective collision object. A person skilled in the art may use other algorithms to compute reachable nodes based on the identified local extrema. Such algorithms may include checks that a particular reachable node is within a navigable area. It is to be noted that a reachable node does not necessarily imply a collision free path segment. Rather, further collision objects which are not on the direct connection between current start and current target location may represent obstacles on the way to the reachable node.

For the next iteration, the graph generator generates for each identified node from the (existing) representation a further representation of the vehicle. The further representation has the same current location as the representation and has a list of targets comprising all elements of the representation's list of targets as well as the identified node as new most recent target location. In other words, when the graph generator identifies such reachable nodes a replicator of the graph generator generates clone copies of the vehicle representation with each clone dedicated to move to a respective identified node. In other words, each clone is configured to calculate a move to the respective reachable node. The identified node is therefore added to the list of targets of the clone copy to represent the next target location for the respective clone copy. For example, the list of targets may be implemented as a last-in-first-out queue.

When performing the above if-else operations iteratively until the original vehicle representation and/or one or more clone copies of the vehicle representation have reached the received (final) target location, the generator is constructing segment-by-segment a graph which consists of collision free-path segments providing a plurality of options for the real-world vehicle to go from the received start location to the received target location by avoiding any real-world collision with the potential real-world collision objects. In other words, the graph generator constructs collision-free paths for the vehicle based on the collision-free path segments which were determined during the iterative process.

The collision-free paths are then provided to a path selector. The path selector can be a human user which selects a particular path from the provided collision-fee path options. The path selector may also be a computer system which selects a particular collision-free path based on pre-defined preferences (e.g., shortest route, fastest route, route with lowest fuel consumption, etc.).

In one embodiment, the path selector may further include a post-processing module. The post-processing module can apply one or more of the following post-processing activities to the constructed collision-free paths.

In a first post-processing activity, it may be desirable to smoothen a path, for example by using splines to remove non-convex properties, such that a vehicle can avoid abrupt movements or sudden changes to its course. In some instances, physical restrictions, for example a maximum steering angle or inertia may even invoke such a post-processing step.

In a second post-processing activity, one or more waypoints along one or more path segments of a path may be added to the path. For example, for a water vehicle entry and exit points to (sulphur) emission control areas ((S)ECA zones) may be added. Another example is to add entry and exit points to areas with tolerable but heavy weather conditions, such that in the path selection step this information can be provided.

In a third post-processing activity, one or more waypoints from a path may be removed if it is determined that a vehicle can go straight from a preceding to a succeeding waypoint, thereby reducing for example the total length of the path, which may be desirable when the objective is to find the shortest route.

The iterative construction of the graph is designed in such a way that each clone of the vehicle representation can find collision-free path segments totally independent from the other vehicle representations. This allows a high degree of parallelization of the graph construction to make full use of parallel processors (e.g., by using an appropriate multi-processor or multi-core computing device). In each iteration, newly cloned vehicle representations can be assigned to respective processor units for the computation of collision free path-segments. Dependent on the number of path forkings (which depends on the complexity and number of collision objects) the growth in the number of vehicle representations from one iteration to the next iteration can be substantial (e.g., exponential). The proposed graph data structure creation process allows to allocate additional parallel computing resources on demand (dependent on the number of clones) and to guarantee a quasi-real-time route computation even in cases with complex collision object situations. A person skilled in the art can handle devices with a limited number of processors or cores by balancing the workload for each processor/core so that the use of the available processors/cores is optimized for performing the necessary computations with a high degree of parallelization. At the same time, the proposed graph data structure creation process substantially reduces the size of operating (main) memory which is needed by the generated graph in comparison to the previously described prior art solutions. Graphs as used in prior art solutions require the storage of a significantly higher amount of information leading to high memory consumption when compared to the graphed proposed according to the present disclosure. The low requirements for main memory and the use of multi-core processors being used in many smartphones of tablet computers allows to perform the route computation on such standard devices for highly complex collision scenarios with acceptable response times for providing the various collision-free route options to a path selector (e.g., the user of the device). Acceptable response times as used herein are response times where the route computation takes less time than the time required for traveling a real world route which corresponds to a path segment of the computed collision-free-route(s). In certain scenarios, a quasi-real-time response may be required (e.g., when a drone needs to avoid a collision with another airborne vehicle moving on a collision course). The provided route computation system and method allows route computations or route adjustments within less than a second even for complex route computation scenarios.

In one embodiment, the interface of the route computation system may be configured to receive, from the path selector, a selected collision-free path. The route computation system may then update a control system of the vehicle with the selected collision-free path to adjust the moving direction of the vehicle according to the selected path. This embodiment allows to use the selected path as input to the navigation control means of the real-world vehicle so that a collision of the real-world vehicle with the real world collision object(s) is automatically avoided.

In one embodiment, a particular polygonal representation of a particular potential collision object is associated with sensor data indicating the current position of the particular potential collision object. In this embodiment, dynamic collision objects may be identified via sensor data such as radar sensor data, satellite pictures or other sensors which are appropriate to locate moving objects or phenomena and their boundaries.

In one embodiment, in case the direct connection is collision-free, the graph generator may delete the representation of the respective vehicle if the list of targets is empty. In this case, the vehicle representation has no purpose anymore and the memory consumed by the vehicle representation can be freed up.

In one embodiment, the level of parallelization can be further improved by fully parallelizing the identification of the local extrema. In this embodiment, an extrema identifier of the graph constructor identifies reachable nodes by determining a first group of polygon segments of a particular polygonal representation which comprises the polygonal segments with the deviation angle to the left for circumventing the corresponding collision object, and by determining a second group of polygon segments of the particular polygonal representation which comprises the polygonal segments with the deviation angle to the right for circumventing the corresponding collision object. Then, for each determined polygon segment with deviation angles to the right, the extrema identifier independently marks the node having the higher value in the deviation angle, and for each determined polygon segment with deviation angles to the left, the extrema identifier independently marks the node having the higher value in the deviation angle. It is to be noted that the marking of polygon nodes can be fully parallelized because it does not matter at all in which order the polygon segments are marked. It is only relevant that the marking is applied to all polygon segments. That is, in the extreme (unlikely) case of providing a number of parallel processors corresponding to the number of polygon segments to be marked, for example by utilizing a graphics processor unit (GPU), the marking could be performed in a single iteration step. In the case of using standard multi-core processors of standard mobile computing devices, the marking can be distributed on the various processors to achieve optimal load balancing. Such load balancing methods are known by a person skilled in parallel computing technology.

After completion of the parallel marking step the extrema identifier identifies nodes with two marks as local extrema of the particular polygonal representation to the left or to the right. Finally, it obtains the reachable nodes by filtering out the local extrema of a particular polygonal representation which are hidden for the current location (i.e., for the vehicle representation at the current location in the respective iteration of the graph construction) by one or more local extrema of one or more polygonal representations. For example, when looking at a collision object from a vehicle representation, an identified local extrema node may be located on the front side of the collision object which is facing the vehicle. Another local extrema node may be located at the back side of the collision object and is therefore not a reachable node for the represented vehicle.

Based on the identified reachable local extrema nodes the extrema identifier can then identify the reachable nodes with the highest values in deviation angles to the right and to the left as the global extrema of the particular polygonal representation. The global extrema identification is computationally extremely efficient because only the identified reachable nodes (which were computed in parallel) are being processed. This is typically a small number compared to the total number of nodes of a polygonal representation of a collision object. Prior art solutions however need to compute the global extrema by analyzing all polygon segments of the collision object. That is, the independent parallel marking of polygon nodes by multiple processors or cores generates a node data structure which includes a fraction of the total number of polygon nodes as the basis for the determination of the extrema, and thereby, provides an efficient filter for the determination of the global extrema of a polygonal representation in relation to the current location of the vehicle representation.

The route computation method can be further accelerated by using embodiments with performance based filters. In one embodiment the performance based filter is configured to filter local extrema by checking the admissibility of intermediate target locations. For example, a particle can keep a record of prior decisions made when choosing a reachable node (e.g., turn right to avoid collision object). If a collision object is identified when checking a direct connection from a current start location to a current target location, where in a previous step the particle already made a decision, it can use this information to dismiss local extrema that would render the previous decision suboptimal. For example, a particle that made the decision to turn right to avoid a collision object might discard local extrema in a later step that would imply a turn to the left, if the objective is to find a short route because there likely exists a clone which made the decision to turn left to avoid this particular obstacle, and this respective clone (or its descendants/ subsequent clones) likely found a route that is at least as short. In other words, performance based filters act as graph pruning methods, for example by stopping the exploration of paths that can be judged as suboptimal or by removing segments (and thereby reducing memory consumption) that are definitely not part of the optimal path with regards to the respective preferences (e.g. minimize time or distance). The discarded local extrema nodes are classified as non-admissible intermediate target locations and will therefore not be considered for route options.

In one embodiment, the performance based filter is configured to filter out local extrema which are not global extrema. For example, if the objective is to find the shortest route, a particle that selects a local extremum either to the left or to the right other than the global extremum of the respective direction, will, at best, perform as good as the particle that chooses to go straight towards the global extremum, because it will eventually need to go to the global extremum to circumvent the obstacle.

In one embodiment, the performance based filter is configured to delete a particular vehicle representation if the particular vehicle representation can be judged to perform worse than a competing vehicle representation with regards to chosen preferences (e.g. minimizing distance, minimizing time). For example, if the objective is to find the shortest route/path and a particle representation requires a longer distance to reach a particular location (either a previously visited location or one of the locations from the list of targets) than a competing vehicle representation, it can be judged as dominated by that competing vehicle representation and therefore be deleted.

A person skilled in the art may provide further performance based filters, such as for example, a filter where particles determine a lower bound and an upper bound to a quantity or measurement they will consume or need and which has to be minimized. In this example, particles continuously monitor and compare their lower and upper bounds with the lower and upper bounds of competing particles. If a particular particle determines that its lower bound is higher than another particle's upper bound, it can be deleted to free up memory occupied by its corresponding vehicle representation, as well as to better utilize the available computing capacity. A performance based filter may also be combined with one or more other performance based filters.

In one embodiment, a computer system is provided which can execute the functions of the previously disclosed method. The graph data structure is generated by the computer system in such a manner that it can take full advantage of a multi-processor or multi-core capability of the hardware configuration with relatively low main memory capacity as available in mobile devices, such as for example smartphones or tablet computers. The system is therefore configured to determine collision-free paths for a vehicle to navigate from a start location to a target location with quasi-real-time response behavior enabled through parallel processing on devices with main memory constraints in the order of Gigabytes or even a few hundred Megabytes, dependent on the level of detail in the respective map data.

In one embodiment, a computer program product is provided that, when loaded into a main memory of the computer system and executed by at least one processor of the computer system, performs the steps of the above disclosed computer-implemented method.

Further aspects of the present disclosure will be realized and attained by means of the elements and combinations particularly depicted in the appended claims. It is to be understood that both, the foregoing general description and the following detailed description are exemplary and explanatory only and are not restrictive of the present disclosure, as described.

BRIEF DESCRIPTION OF THE DRAWINGS

FIG. 7 is a diagram that shows an example of a generic computer device and a generic mobile computer device, which may be used with the techniques described here.

DETAILED DESCRIPTION

Figure 1:
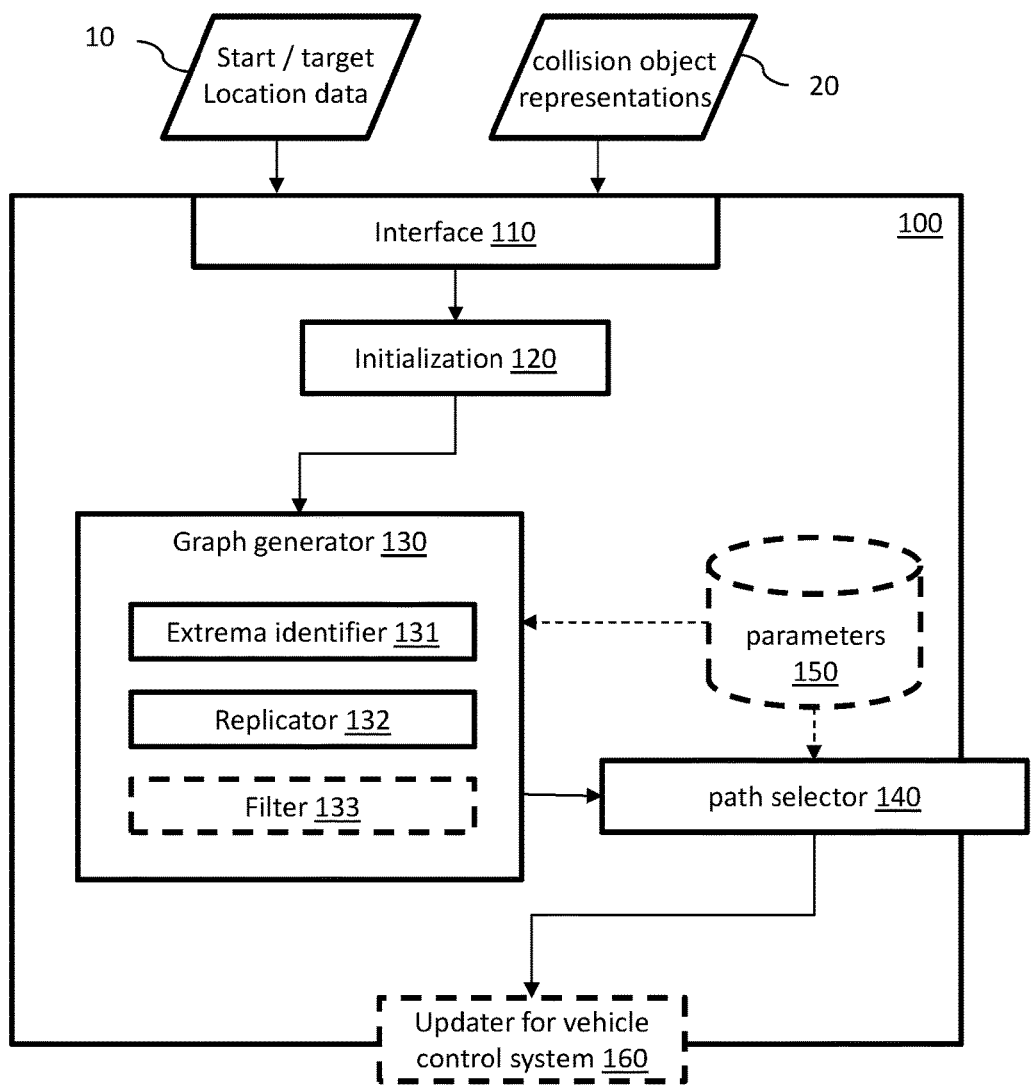
FIG. 1 shows a simplified diagram of a computer system for determining collision-free paths for a vehicle to navigate from a start location to a target location enabled for parallel processing according to an embodiment of the present disclosure.
Figure 2A:
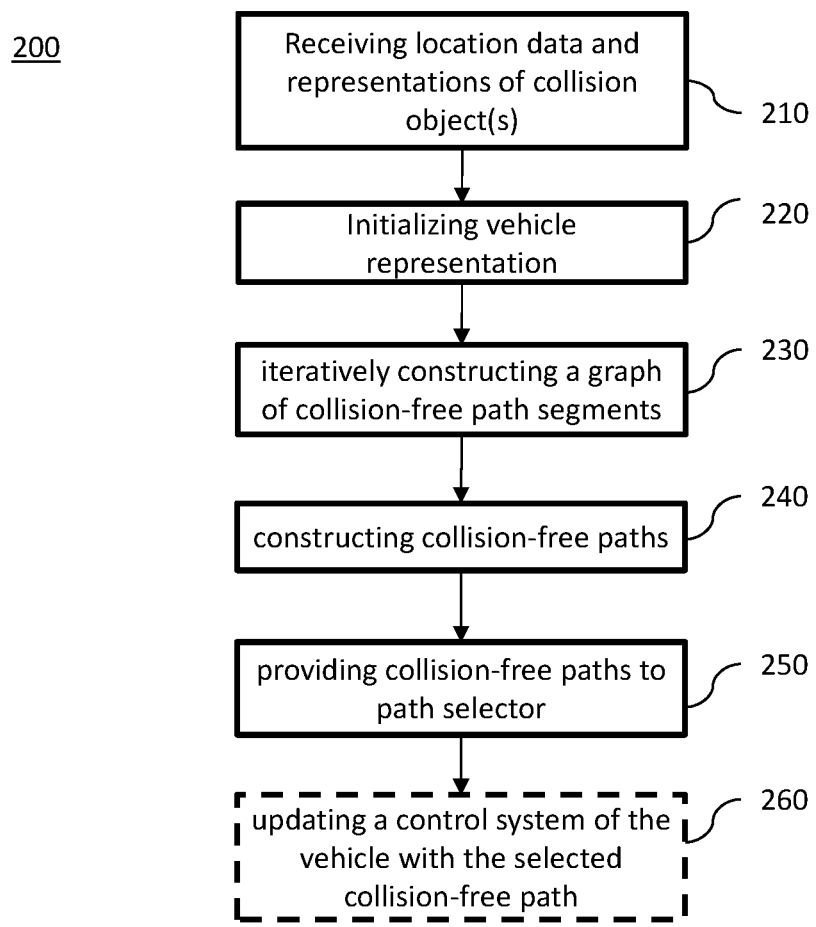
FIGS. 2A, 2B are simplified flowcharts of computer implemented methods which can be executed by respective embodiments of the computer system.
Figure 2B:
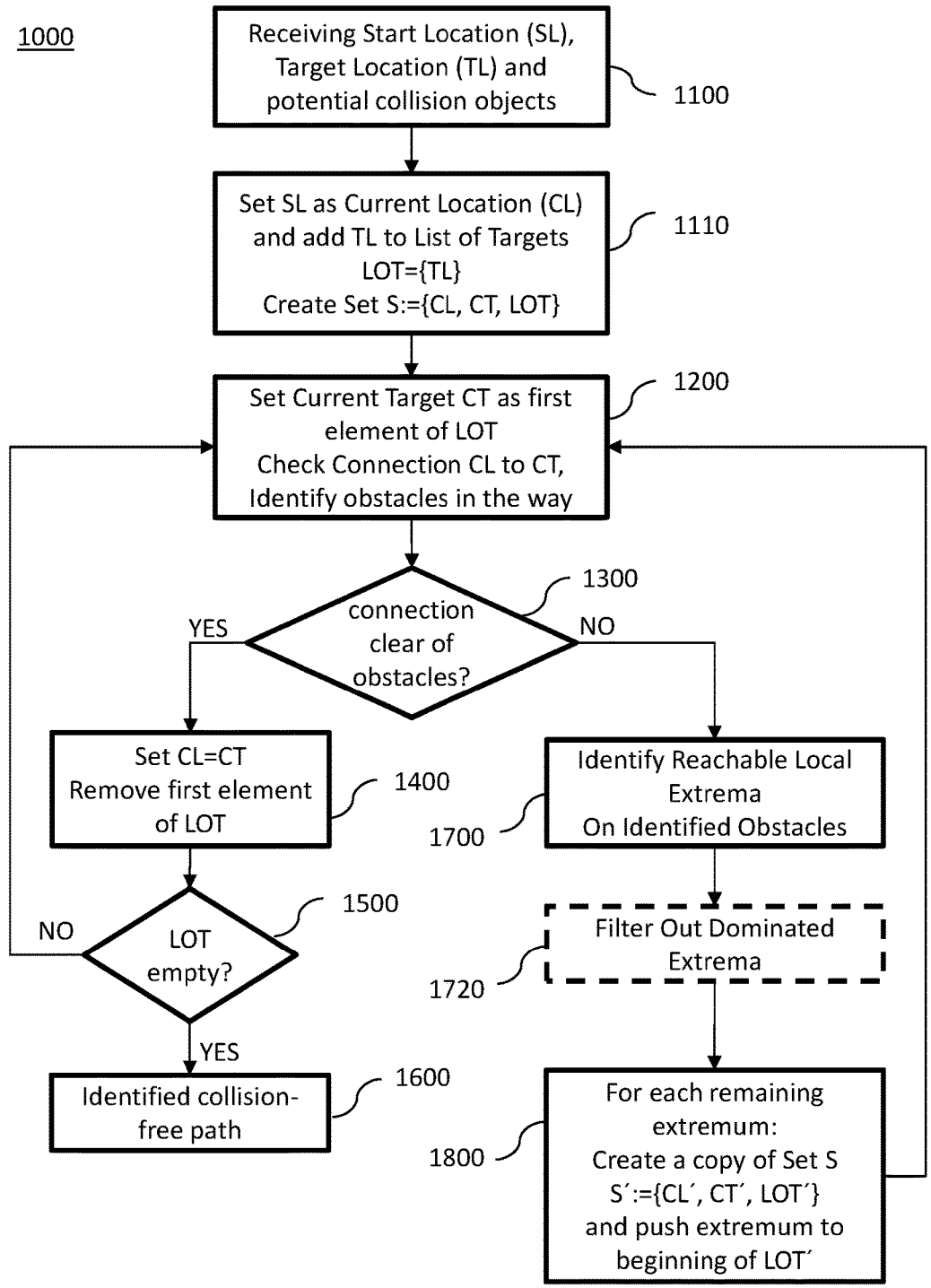

FIG. 1 shows a simplified diagram of computer system 100 for determining collision-free paths for a vehicle to navigate from a start location to a target location enabled for parallel processing, according to an embodiment of the present disclosure. FIG. 1 is disclosed in the context of the simplified flowcharts illustrated in FIGS. 2A, 2B. The simplified flowcharts illustrate computer implemented methods 200, 1000 which can be executed by respective embodiments of the computer system 100. The following description, therefore, makes use of reference numbers from the FIGS. 1, 2A, and 2B.

The computer system 100 of FIG. 1 is configured for parallelized determination of collision-free paths for a vehicle to navigate from a start location to a target location. The system 100 has an interface component 110 to receive 210, 1100 start and target location data 10 and to receive one or more polygonal representations 20 of one or more potential collision objects. Receiving location data and receiving polygonal representations does not need to occur simultaneously but can occur sequentially from different data sources. Start/target location may be provided by a computer system through a machine-to-machine interface, or may be provided by a human user of at the computer system 100 in which case the interface 110 may include an appropriate human-machine interface (e.g., a graphic user interface or an audio interface) which allows the user to input such data.

An initialization component 120 of the system 100 initializes 220 a representation of the vehicle. The representation includes the received start location SL as current location CL, and further includes a list of targets LOT comprising the received target location TL. In other words, the initialization component 120 sets 1110 SL as current location CL and adds TL to the list of targets LOT={TL}. The initialized representation (particle) of the vehicle can be seen as set S:={CL, CT, LOT}. Thereby, the target location which has been added last to the list of targets in the LOT (i.e. "last in") is referred to as "the most recent target location" herein. In the following description it is assumed that the LOT is implemented as a Last-In-First-Out queue. A person skilled in the art may use other queue structures instead.

The graph generator 130 now iteratively constructs 230 a graph of collision-free path segments (e.g., by concatenating the respective path segments) by iteratively calling an extrema identifier module 131 and a replicator module 132 for each vehicle representation, as long as the received target location is not reached by the respective vehicle representations. Iteratively constructing 230, as used herein, refers to the repeated execution of the same construction steps to virtually move the vehicle representations through the graph to the received target location wherein each iteration is computed based on a new set of input parameters and the new set of input parameters results at least partially from the previous iteration step. The iteration can be implemented in a loop structure where the iteration is stopped once a termination condition is met. The termination condition for the iterative construction with regards to a particular vehicle representation is met when the particular vehicle representation has reached the received target location TL.

In a first sub-step of an iteration step for a particular vehicle representation, the graph generator sets 1200 the first element of the respective LOT (most recently added target location) as the current target CT for the particular vehicle representation and checks whether the direct connection from the vehicle representation's current location CL to the current target CT is collision-free. In other words, the graph generator determines 1300 whether a collision object (i.e. an obstacle) is located on the direct connection between the current location and the most recent target location in the list of targets.

If the direct connection is collision-free (cf. 1300/YES in FIG. 2B), the graph generator saves a corresponding path segment as an edge of the (to-be-constructed) graph. Further, for the next iteration, the most recent target location CT is set 1400 as new current location CL of the particular vehicle representation (start location of a new segment) and the most recent target location is removed from the list of targets LOT. In case there are further target locations in the LOT (i.e. LOT is not empty 1500/NO) this process is repeated until the LOT is empty which results in the constructions and identification 1600 of a collision-free path in the graph. When the list of targets is empty the graph generator may delete the representation of the respective vehicle to not further block any processing or memory resources of the system 100.

If the direct connection is not collision-free (cf. 1300/YES in FIG. 2B), the extrema identifier 131 of the graph generator identifies 1700 reachable nodes on one or more polygonal representations intersecting with the direct connection wherein the identified nodes are based on local extrema relative to the deviation angle to the left or to the right from the direct connection between the current location and the most recent target location (current target). In other words, the extrema identifier 131 identifies the reachable nodes as a subset of the nodes of the polygonal representation which need to be circumvented in order to avoid a collision with the respective collision object. For example, the extrema identifier can identify the global extrema amongst the reachable nodes as intermediate targets for the particular vehicle representation. It is also possible to use reachable nodes in the neighborhood of the identified local/global extrema. For example, a safety distance may be implemented as explained earlier. One may also use a random water location as reachable node within a predefined distance from the respective identified extrema node.

To enable parallelization of the graph construction, the graph generator has a replicator 132 which can replicate 1800 (or clone) the particular vehicle representation as often as intermediate targets have been identified for the particular vehicle representation. After the replication, a number copies of the particular vehicle representation is available so that each copy (i.e. a copy of the set S) can virtually move towards one of the intermediate targets in parallel. In other words, the replicator 132 generates 1800, for the next iteration, from the vehicle representation a further representation for each intermediate target. This further representation (cloned set S') has the same current location CL as the original representation because it starts from the same location. Further, its list of targets comprises all elements of the original representation's list of targets as well as a particular intermediate target as new most recent target location. This new most recent target location becomes the current target CT' for the further representation in the next iteration step starting again with sub-step 1200. In other words, a local extremum which is identified as an intermediate target is pushed to the beginning of the respective LOT queue so that it can be retrieved again as the first element from the LIFO-queue. The next iteration stage is performed for all generated 1800 clone copies of the vehicle representation. It is to be noted that the term "clone" is not used in the biological sense in that a one hundred percent identity exists between the copies. Rather, the skilled person understands that the different clone copies differentiate with regards to their LOTs in that they have different most recent target locations (namely the various intermediate targets).

Optional filter step 1720 can be used to further improve the performance of the collision-route computation. A local extrema node which is discarded by any one of the performance based filters is referred to as a dominated extremum. That is, there is at least one further local extremum which leads to a better route. Such dominated extrema can be filtered out 1720 so that such extrema will not be taken into account for any subsequent iteration. This filtering function provides a further improvement for execution time and memory consumption of the route computation system and method because less promising route options are not subject to further computational steps.

The graph generator 130 finally constructs 240 collision-free paths based on collision-free path segments which were saved during the iterative graph construction. For example, each sequence of collision-free-path segments which was identified 1600 by a vehicle representation that has reached the final target location TL defines a collision-free path. However, not every clone copy necessarily reaches the received target location TL. As disclosed in the example given by FIGS. 3 and 4, vehicle representations may be deleted again when using performance base filters 133 which determine that it makes no sense to perform computations for the respective representation until it reaches the final target because it was determined that other vehicle representations already have found a better route. Different optional filters 133 may be used/applied dependent on predefined parameters 150 (e.g., traffic rules, constraints, etc.). The deletion of such vehicle representations saves further computing resources. In other words, processors or cores which are freed up by deleting a vehicle representation can be allocated another vehicle representation to further speed up the route computation and making better use of the parallel computing capacity of the route computation system 100.

Finally, the collision-free paths are provided 250 to a path selector 140. The path selector can be a further computing module of the computer system 100 or in a remote system which is communicatively coupled with the system 100. The path selector may select a particular collision-free path in accordance with predefined selection criteria as defined by respective parameters 150 (e.g., shortest path, shortest time, lowest fuel consumption, etc.). The path selector may also be implemented as a human-machine interface where a human user of the system can make a manual selection of one of the provided paths via standard user interface technologies (e.g., touch screen, mouse click, etc.)

The system 100, may include or may be communicatively coupled with an updater 160 for the (real-world) vehicle's control system. The updater 160 may receive a selected collision-free path from the path selector 140 and then automatically update 260 the control system of the vehicle with the selected collision-free path to adjust the moving direction of the vehicle according to the selected path. This way, autonomous driving is enabled for the real-world vehicle in embodiments where the path selector is a technical system and not a human being.

Figure 3:
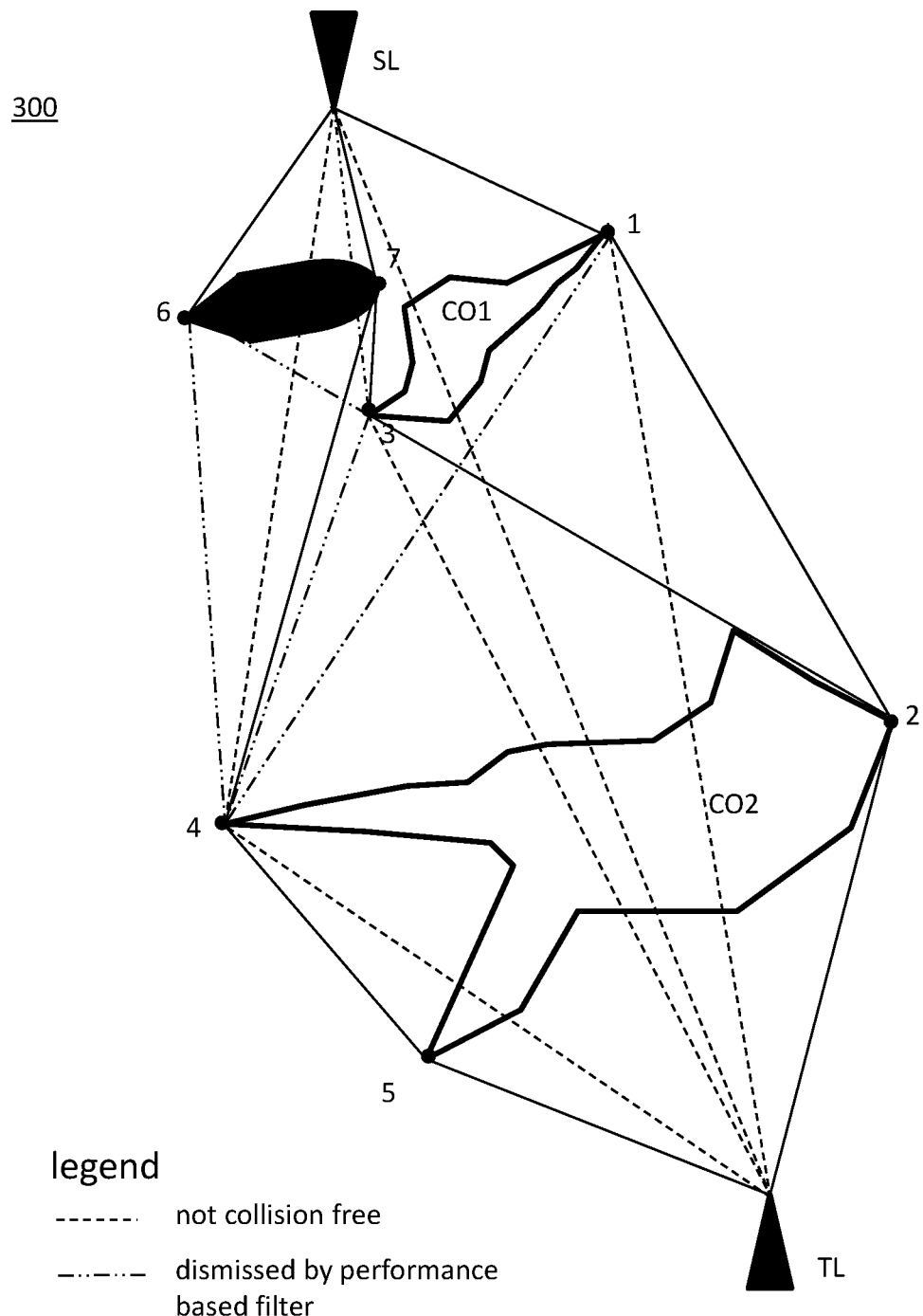
FIG. 3 is an example graph with collision-free path segments from a start location to a target location.

FIG. 3 is an example graph 300 with collision-free path segments from a start location SL to a target location TL. FIG. 3 is described in the context of the flow chart of FIG. 4 which illustrates the generation of the example graph 300.

The graph 300 illustrates collision-free paths from a start position SL to a target location TL for a vehicle in a continuous environment. A continuous environment as used herein is a metric space such as the two-dimensional Euclidian plane or the three-dimensional Euclidian space (e.g., when navigating on a sphere), in contrast to a graph-like structure as used in navigating a road network or railway network. For example, the vehicle may be a vessel (e.g., a boat, ship or underwater vehicle) which needs to navigate from the start location SL to the target location TL. However, in the example, there are collision objects CO1 and CO2 which are obstacles for the vehicle to move from SL to TL along the direct connection SL-TL (dashed line). In the example, CO1 and CO2 are polygonal representations of obstacles in the sea or a lake which need to be circumvented by the vehicle in order to avoid collision of the vehicle with any of the collision objects in the real world. The collision objects CO1, CO2 may represent islands, sandbanks, icebergs, etc. and the borders of the polygonal representations in the example may represent the rims of the collision objects under water where the water is deep enough so that the vehicle can pass by the collision object without touching sea ground.

The polygonal representations CO1, CO2 may correspond to static collision objects which are at fixed locations and may be provided by geographic contour map data, such as a digitized sea map including detailed geo-locations of the respective collision objects horizontal equivalents of contours with the regards to the water depth around the collision objects. Besides the avoidance of collision with static collision objects, collisions with dynamic (i.e., moving) collision objects also need to be avoided. Examples of dynamic collision objects can be other vehicles (vessels, ships, boats, etc.), weather phenomena (e.g., storms, hurricanes), or water phenomena (e.g., strong currents, high waves due to sea quakes, etc.). Data regarding the dynamic collision objects are typically received from sensors which are used for monitoring the respective phenomena. For example, other vehicles may be detected via radar technology or via positioning systems (e.g., GPS or alike). Weather phenomena may be detected via satellite pictures. Water phenomena may be detected via seismic sensors. It is state of the art to determine the geo-coordinates of such detected phenomena and provide the corresponding polygonal representations of the associated dynamic collision objects. For example, radar systems may detect the location of a certain vessel. In combination with the Automatic Identification System (AIS) signal of the vessel including the name/ID of the vessel the associated vessel type can be retrieved with a corresponding polygonal representation from (available) database systems.

In the example of FIG. 3 the polygonal representation CO3 corresponds to such a horizontal projection of a vessel collision object. In the case of dynamic collision objects the polygonal representations may already include a safety distance with respect to the actual boundaries of the collision object. For example, the polygonal representation of a ship may add 100 meters in each direction to the real dimensions of the ship or it may be extended, stretched or otherwise manipulated to account for its movement.

Figure 4:
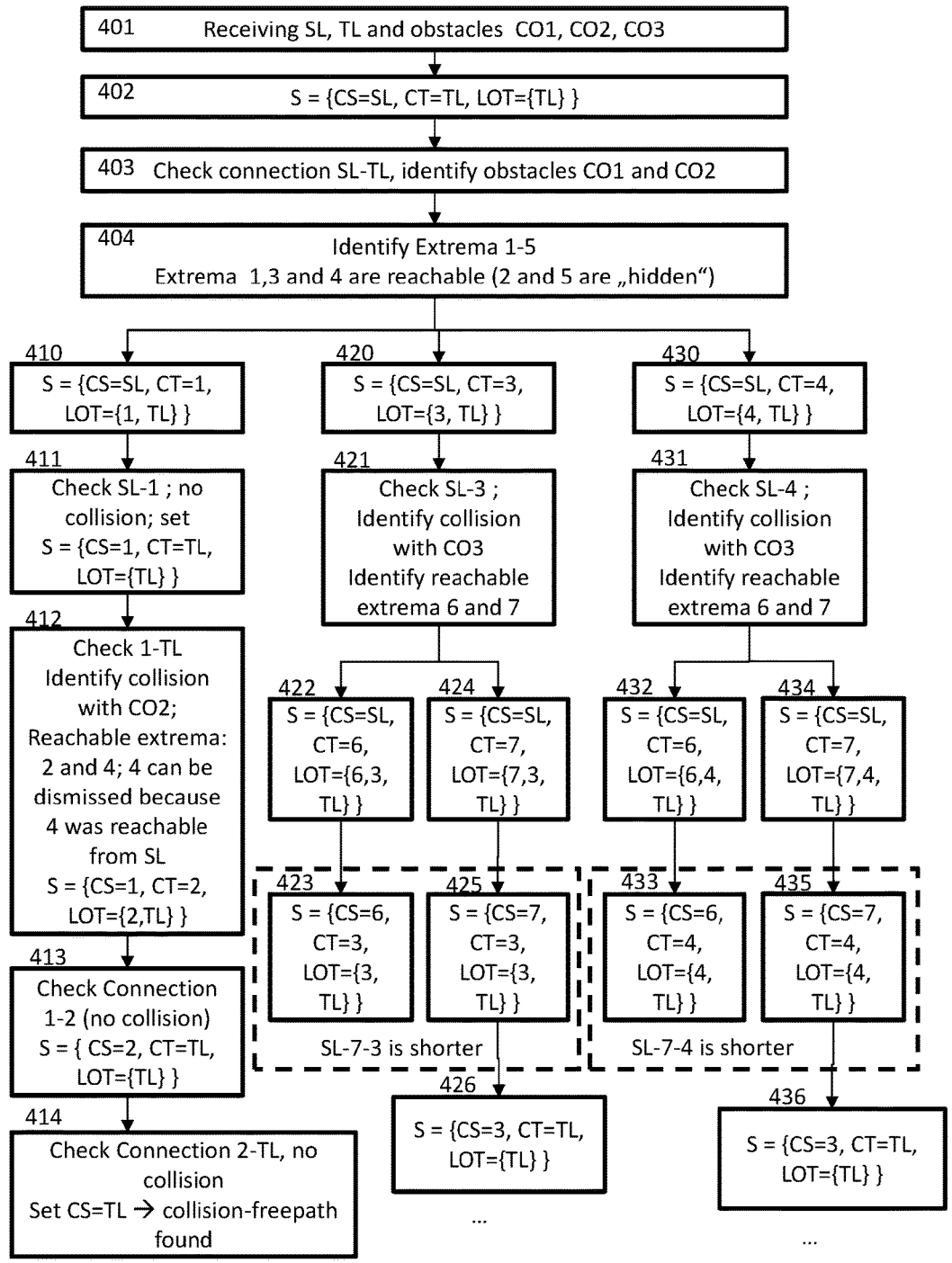
FIG. 4 is a flow chart which illustrates the generation of the example graph.

FIG. 4 is a flow chart which illustrates the generation of the example graph. As mentioned above, one particular goal of the techniques described herein may be to navigate a vehicle from SL to TL without collision with the potential collision objects CO1, CO2, CO3. Initially, as detailed in FIG. 4, the route computation system for collision avoidance receives 401 the start location SL of the vehicle (which may correspond to the vehicles current location), the target location TL and the polygonal representations CO1, CO2, CO3 of the potential collision objects. In an initialization step 402 the route system initializes, for a first set S, a variable for the current (start) location CS with the received start location SL, and initializes a variable for the current target location TL with the received target location TL. Further, for the first set S a list of targets LOT is generated to which the received target location TL is added. A set in general, as used herein, corresponds to a representation of the vehicle at a particular location (node of the graph). A set is sometimes also referred to as particle.

In the next step 403, the route system analyses whether collision objects are preventing the vehicle to go from SL to TL on the direct connection (dashed line) SL-TL. The direct connection could be a straight connection on a plane or a shortest connection along the great circle on a sphere. Based on the geo-coordinates of the respective potential collision objects and their polygonal representations CO1, CO2, CO3, the system identifies the polygonal representations CO1 and CO2 as obstacles for the vehicle on its way to TL. In one embodiment, in this checking step 403, the representation CO1 may be identified and further processed whereas the representation CO2 can be handled later in the process once a collision-free path segment has been found to circumvent CO1. However, it may be advantageous to determine all obstacles on the way to the final target location TL in this initial checking step 403 because it provides more information that can be used to increase performance of the algorithm by filtering out dominated intermediate target location sequences before they are explored.

Once the polygonal representations CO1, CO2 are identified as obstacles, the route system identifies 404 nodes 1 to 5 on the polygonal representations CO1, CO2 wherein the nodes 1-5 in this embodiment are directly defined as local extrema relative to the deviation angle to the left or to the right from the direct connection SL-TL between the current location CL and the current target location CT. In the graph 300 the identified local extrema are illustrated by the black points 1-5. The local extrema identified for CO1 are point 1 (deviation to the left) and point 2 (deviation to the right). The local extrema identified for CO2 are point 2 (deviation to the left) and points 4, 5 (deviation to the right). In view of the obstacles CO1, CO2 (CO3 is not known yet as it does not intersect with the direct connection SL-TL) the local extrema 1, 3, and 4 are reachable from SL whereas the identified local extrema 2 and 5 are hidden (by CO1 and CO2, respectively).

The vehicle on its optional route paths may be represented by a particle related set. At this stage the route system knows that it needs to evaluate the three options of the potentially collision-free path segments SL-1, SL-3, SL-4. The three options may by analyzed sequentially. However, with the proposed approach and graph data structure 300 it is possible to perform this approach in parallel by using a multi-processor platform. By using parallelization, the system can provide route computations and route adjustments in quasi real time for detailed polygonal representations (with large numbers of polygon segments), long distances or large numbers of collision objects. This becomes relevant especially in situations where dynamic collision objects are recognized on a short notice (e.g., another ship under foggy weather conditions or a tornado which has just taken a collision course but is still at a distance to the vehicle which allows to circumvent the tornado). An immediate adjustment of the vehicle's direction may be indicated in such situations to avoid collision. The parallelization is achieved by cloning the particle representing the vehicle as many times as reachable local extrema were identified in the previous step where each particle takes a hypothetic route to one of the identified reachable local extrema.

In the example, the first particle p1 goes to point 1, the second particle p2 goes to point 3, and the third particle p3 goes to point 4. For each particle the steps 402 to 404 are iteratively repeated.

For the first particle a second set (or particle) is generated 410 which still includes the original start location SL as the current location CL. However, the second set now has as the new current target location CT the reachable target point 1. This intermediate target is also added to the list of targets of the second set. For simplicity reasons, all further sets are named S in the flowchart of FIG. 4. A person skilled in the art will understand that each cloned particle has its own set. For the second and third particles third and fourth sets are generated 420, 430, respectively. The third set includes the original start location SL as the current location CL. However, now the third set has as the new current target location CT the reachable target point 3. This intermediate target is also added to the list of targets of the third set. The fourth set includes the original start location SL as the current location CL. However, now the fourth set has as the new current target location CT the reachable target point 4. This intermediate target is also added to the list of targets of the fourth set.

For the first particle, the route system checks 411 whether collision objects are preventing the vehicle to go from the current location CL=SL to the current target location CT=1 on the direct connection SL-1. No collision objects are found. As a result, SL-1 is saved to the graph as a collision-free path segment and point 1 becomes the new current location CL=1 and the original received target location becomes the current target location CT=TL.

The intermediate new target location point 1 (which is now the current location) is removed from the list of targets. In other words, the list of targets corresponds to a last-in-first-out queue where targets which have been added last are removed first once they are reached by the respective particle.

The step 412 corresponds to the iteration of the steps 403, 404 with regards to CS=1, CT=TL. In other words, the route system checks 412 the direct connection 1-TL to identify collision objects intersecting with the direct connection and, therefore, representing an obstacle for the vehicle represented by the first particle. CO2 is identified as polygonal representation of a collision object. The local extrema 2, 4 are identified as reachable local extrema. In one embodiment, the first particle would be cloned into two further particles where one would go from point 1 to point 2 and the other one would go from point 1 to point 4. However, in the example a performance filter is implemented which dismisses the path option 1-4 as explained further down in more detail. Therefore, the option to go from SL to point 4 via point 1 (SL-1-4) is less advantageous than the direct connection SL-4 when looking for the shortest path. By dismissing less promising route options through the application of performance filters valuable computation time and computation resources can be saved in the forthcoming iterations because each particle would otherwise trigger a full iteration cycle. As a result, the set for the first particle is updated in that point 2 is added to the list of targets and point 2 is also set as the new current target location.

In the next iteration for the first particle, the route system checks 413 the direct connection 1-2 between current location CL=1 and current target location CT=2 for potential collision objects. As no further collision object is identified the collision-free path segment 1-2 is saved to the graph 300 and the set of the first particle is updated accordingly by assigning point 2 to the current location (i.e., the first particle representation of the vehicle has now moved to point 2), removing point 2 from the list of targets and replacing the current target location with the original received target location TL. In some implementations, removing point 2 from the list of targets has no impact on the already saved graph segment 1-2. It simply means that point 2 is removed from the intermediate targets because the vehicle representation has already reached this point in the current iteration step.

In the next iteration for the first particle, the route system checks 414 the direct connection 2-TL for potential collision objects. No further collision objects are identified. As a result, the collision-free path segment 2-TL is saved to the graph 300. The first particle moves to the current target location TL and the corresponding set is updated in that the current location CL becomes the original received target location TL. This indicates that the first particle has reached its final destination and no further iteration is indicated to be performed. A first collision-free path SL-1-2-TL has been determined by the route system.

Turning now to the second particle, for which the third set was generated in step 420, the following check 421 for potential collision objects on the direct connection SL-3 may lead to the discovery of the polygonal representation CO3 of a further collision object which is an obstacle on the way to the allegedly reachable point 3. That is, in the first iteration of the steps 403, 404 for the second particle, the route system may discover that the second particle cannot go directly to point 3 without colliding with CO3 and identifies points 6 and 7 as local extrema of CO3 to circumvent CO3. At this stage, both reachable extrema points are valid options (not dismissed by a performance based filter) and the second particle is cloned into two particles p2a, p2b. The steps 402 to 404 are now iterated for both particles 2a, 2b until finally the respective current locations reach the final target location TL. This may include further cloning steps of the respective particles in case multiple route options are valid from a particular current location.

Referring to FIG. 4, the example flowchart shows the two sets generated 422, 424 for the particles 2a, 2b during the first iteration after the cloning. For particle 2a, the reachable local extrema point 6 is added to the respective list of targets and set a new current target location. For particle 2b, the reachable local extrema point 7 is added to the respective list of targets and set as a new current target location. Both direct connections SL-6 and SL-7 are collision-free path segments and therefore saved to the graph 300. Accordingly, the respective sets are updated 423, 425 in that the set for particle 2a sets point 6 as the current location for reaching the current target location point 3 whereas the set for particle 2b sets point 7 as the current location for reaching the current target location point 3. As a result, the new current locations for particles 2a, 2b are set to points 6 and 7, respectively, and the intermediate targets 6, 7 are removed from the respective list of targets. The following check for collision objects on the direct connections 6-3 and 7-3 reveals that both connections are collision-free path segments. Both of them could be saved to the graph 300. However, in the example, a further example of a performance based filter is illustrated. Each particle may have properties which allow the particle to compute parameters, such as for example, the cumulated distance of the collision-free path segments it has to go to reach the current location, or the time it takes to arrive at the current location. Such parameters can be published by the respective particles so that other particles (e.g., all particles or groups of particles) can be informed about the results and compare the parameters of competing particles to its own parameters. In the example, a performance based filter is used which allows the comparison of the cumulated distance parameter. After the iteration where both particles 2a, 2b have arrived at point 3, particle 2a recognizes that the cumulated distance SL-7-3 of particle 2b is shorter than its own distance SL-6-3. If the route system is configured for path distance optimization, particle 2a recognizes that it cannot compete with particle 2b and therefore ceases to exist. The next iteration 426 will then only be performed for particle 2b which now has point 3 as its current location and the original received target location TL becomes the new current target location. From thereon, particle 2b performs the corresponding iterations as particle 1 after it has reached point 1. However, particle 2b does not take into account the route option via point 4 because, in this embodiment, particle 2b remembers (e.g., by accessing a decision history of previously taken routing decisions) that point 4 was identified as a reachable local extremum when checking the step from location SL to location TL. Therefore, particle 2b will not be able to compete with the particle that was sent from location SL to go to point 4, because it has to take a detour to reach point 3 first. This is the same logic as used by the first particle to dismiss the route option SL1-4. This is already known when particle 3b (see the following discussion of particle 3) has reached point 7 and has performed the collision check to reach point 4. That is, particle 2b knows already at this stage that it cannot beat particle 3b via a route option including the path segment 3-4. Therefore, in this example, a corresponding performance based filter prevents particle 2b from being cloned at the current location point 3 but instead it goes on to point 2. In this example, once the particle 2b reaches point 2 the particle 2b realizes that particle 1 found a shorter route to point 2 and ceases to exist.

Turning now to the third particle p3, for which the fourth set was generated in step 430, the following check 431 for potential collision objects on the direct connection SL-4 may lead to the discovery of the polygonal representation CO3 of a further collision object which is an obstacle on the way to the allegedly reachable point 4. That is, in the first iteration of the steps 403, 404 for the third particle, the route system discovers that the third particle cannot go directly to point 4 without colliding with CO3 and, again, identifies points 6 and 7 as local extrema of CO3 to circumvent CO3. At this stage, both reachable extrema points are valid options (not dismissed by a performance based filter) and the third particle is cloned into two particles p3a, p3b. The steps 402 to 404 are now iterated for both particles 3a, 3b until finally the respective current locations reach the final target location TL. This may include further cloning steps of the respective particles in case multiple route options are valid from a particular current location. The example flowchart shows the two sets generated 432, 434 for the particles 3a, 3b during the first iteration after the cloning. For particle 3a, the reachable local extrema point 6 is added to the respective list of targets and set as new current target location. For particle 3b, the reachable local extrema point 7 is added to the respective list of targets and set a new current target location. Both direct connections SL-6 and SL-7 are collision-free path segments and therefore saved to the graph 300. Accordingly, the respective sets are updated 433, 435 in that the set for particle 3a sets point 6 as the current location for reaching the current target location point 4 whereas the set for particle 3b sets point 7 as the current location for reaching the current target location point 4. As a result, the new current locations for particles 3a, 3b are set to points 6 and 7, respectively, and the intermediate targets 6, 7 are removed from the respective list of targets. The following check for collision objects on the direct connections 6-4 and 7-4 reveals that both connections are collision-free path segments. Both connections may be saved to the graph 300. However, in the example, similar as for particles 2, 2b, a shortest distance performance base filter prevents particle 3a to move any further. Particle 3a recognizes that SL-7-4 of particle 3b is shorter than SL-6-4. For this reason, it ceases to exist once it reaches the intermediate target point 4 and the further iterations are only performed for particle 3b.

The iterations may now be completed for the particles 2b and 3b. The final result of the collision-free path determination includes the collision free-path options SL-7-4-5-TL, SL-7-3-2-TL, and SL1-1-TL. These options are then provided to a path selector for selection of a particular collision-free path in accordance with respective selection criteria.

Figure 5:
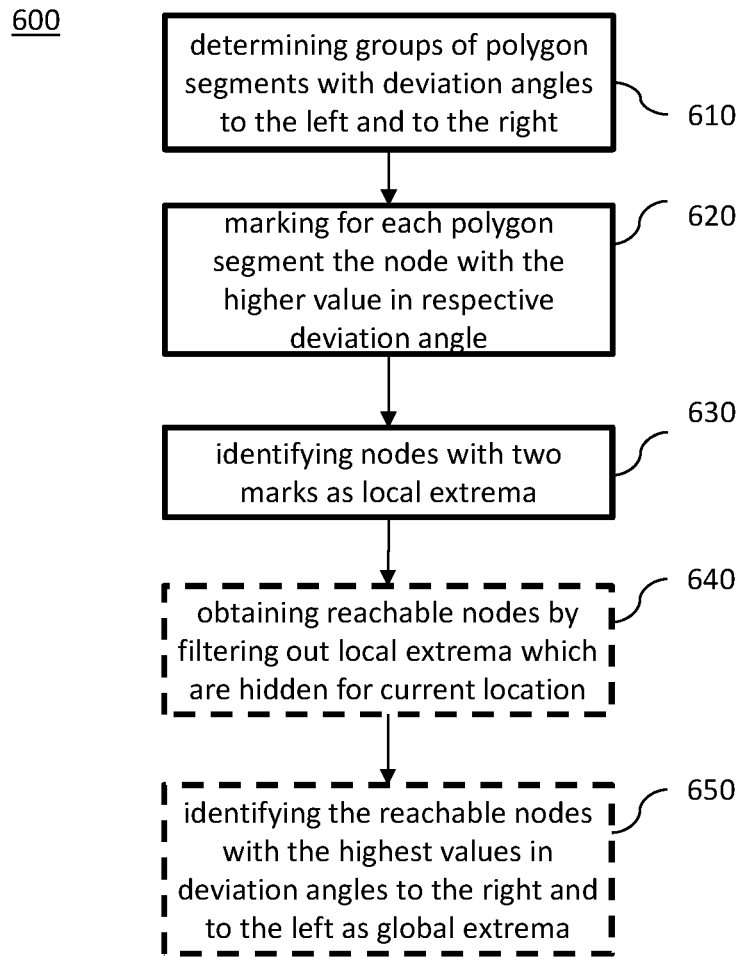
FIG. 5 is a simplified flowchart of a parallelizable computer-implemented method for local extrema identification of collision objects.

FIG. 5 is a simplified flowchart of a parallelizable computer-implemented method 600 for local extrema identification of collision objects. The method can be used in the context of the previously disclosed method for collision-free path computation. It may also be used independently from the previously disclosed embodiments as a standalone method, for example, in cases where only one collision object needs to be circumvented by a vehicle to move from a current location to a current target. When the method 600 is performed as an independent parallelizable computer-implemented method for local extrema identification of collision objects, the method receives as input parameters a current location of a vehicle representation, a current target location (where the vehicle wants to go to), and the polygonal representation of the collision object to be circumvented.

The method of FIG. 5 will be described in the context of the example of FIG. 6 which illustrates parallelized local extrema determination in an example of a simplified polygonal representation of a collision object. In the example, the polygonal representation of the example collision object is defined by the nodes n1 to n21. It is to be noted that a typical polygon representing a real-world collision object, such as for example an island or a coastal region of a continent, can include several millions of nodes.

The straight line defined by the points A, B corresponds to the direct connection between a current location A and a current target (in the direction of B) of a particular vehicle representation. In the example, the direct connection is not a collision-free path segment but intersects with the collision object representation n1 to n21 at the points a, b. In this example, the current location A is in the middle of a ring shaped collision object (such as an atoll) which provides an exit between the nodes n5 and n16. Therefore, the virtual extension of the direct connection into the opposite direction (dashed line) leads to further intersections d, c. Through the virtual extension, the extrema identifier can determine 610 a first group of polygon segments (defined by the nodes n9 to n21) with a deviation angle φ to the left for circumventing the collision object counter-clockwise (ccw), and further determine 610 a second group of polygon segments (defined by the nodes n1 to n8) with a deviation angle to the right for circumventing the corresponding collision object clockwise (cw).

For each determined polygon segment with deviation angles to the right, the extrema identifier independently marks 620 the node having the higher value in the deviation angle. For example, for the segment n8-n7 n7 is marked. For the segment n6-n5 n5 is marked. For the segment n5-n4 n5 is marked, and so on. For every polygon segment which contains a collision point (cf., points a, b, c, d in the example of FIG. 6), both nodes are marked. For example, polygon segment n21-n1 contains collision point a and both nodes n21 and n1 are marked. This is equivalent to separating polygon segments with collision points and then applying the same marking logic as for every other polygon segment without a collision point. For example, polygon segment n21-n1 could be separated into n21-a and a-n1 and then, for those two segments and following the marking logic described above, both n21 and n1 will be marked exactly once by the extrema identifier. As the various segments have no interdependencies which would affect the marking, the marking can be completely parallelized. That is, any segment can be marked by any one of the available processing units at any time without any impact on the final result. This allows taking full advantage of parallel processing devices. The same marking process is applied to deviation angles to the left. That is, for each determined polygon segment with a deviation angle φ to the left, the extrema identifier independently marks the node having the higher value in the deviation angle.

The result of the marking is a data structure including all nodes of the polygonal representation with the received marks. All nodes received either zero, one or two marks. A node receives zero marks if it is neighboring on two local extrema. For example, in FIG. 6, node n4 receives zero markings since both its neighbors, n3 and n5, have a higher value for the deviation angle than that of n4. Also, a node can receive no more than two markings because it has exactly two neighbors. In other words, a node is part of exactly two polygon segments and can therefore receive a maximum of two markings. Further, only local extrema receive exactly two markings and all local extrema receive two markings.

The extrema identifier can identify 630 such nodes with two marks in the marking data structure as local extrema of the particular polygonal representation. That is, each node which is part of two polygon segments and has an deviation value higher than the other nodes in those two polygon segments represents such a local extremum.

Finally, the extrema identifier obtains 640 the reachable nodes by filtering out the local extrema which are hidden for the current location by the particular polygonal representation. In the example, the result of this filtering operation provides the nodes n3, n5, and n16 as potential reachable nodes to circumvent the collision object.

However, when reaching the local extremum n3 the vehicle would still need to move to n5 to finally circumvent the collision object. In order to identify a subset of the reachable nodes which allow the vehicle to circumvent the collision object to reach further targets beyond the collision object, the extrema identifier can identify 650 the reachable nodes with the highest values in deviation angles to the right and to the left (illustrated by the arrows intersecting n5 and n16) as global extrema of the particular polygonal representation using a plurality of processing units in parallel for the marking of nodes. This filtering operation is performed on the reduced subset of reachable nodes (reachable local extrema) which results in substantial performance gains compared to prior art global extrema determination methods while, at the same time, the main memory consumption is restricted to the subset of reachable local extrema nodes. As a result, the path segments A-n5 and A-n16 can be saved as collision-free path segments to the graph data structure.

Figure 6:
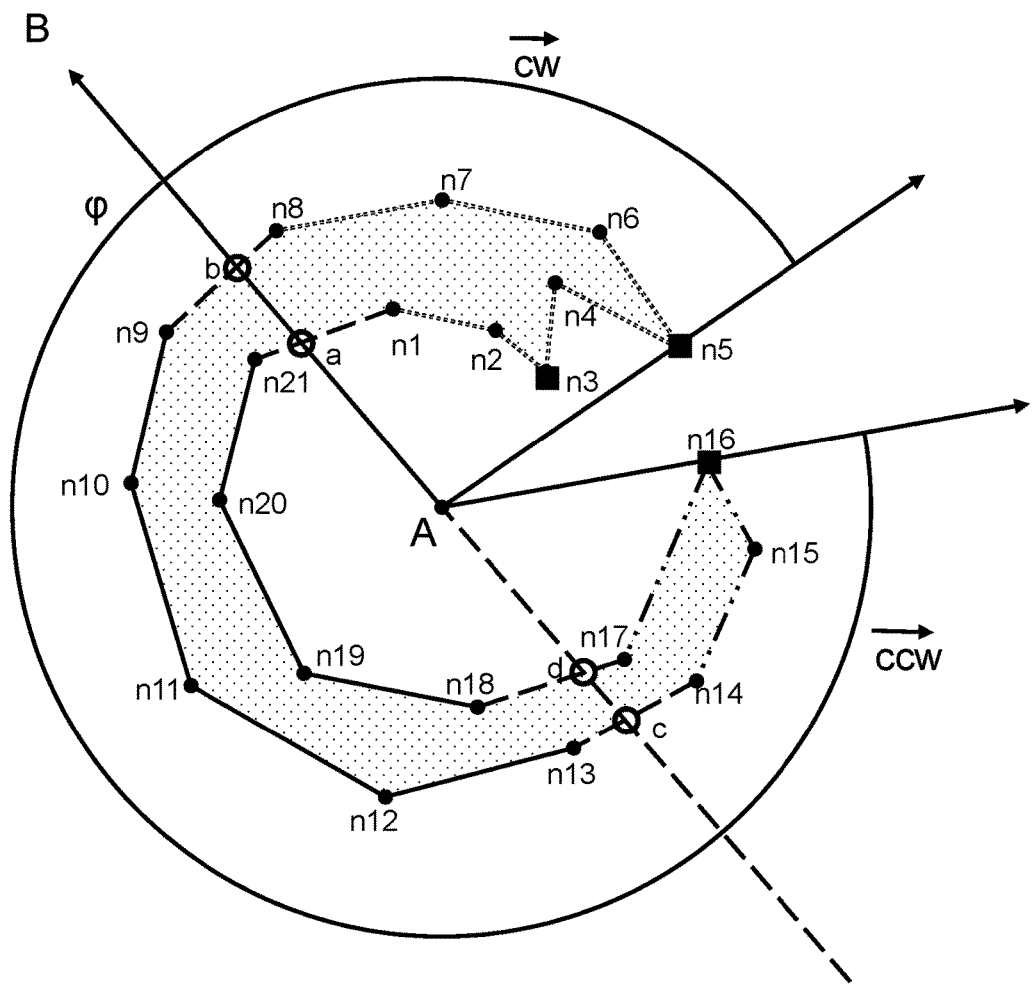
FIG. 6 illustrates parallelized local extrema determination in an example of a polygonal representation of a collision object.

FIG. 6 illustrates the process of identifying nodes based on local extrema on the polygonal representation relative to a deviation angle to the left or the right from a direct connection between location A in a direction illustrated by φ. In a previous step, the collision object was identified as being on the direct connection from A to B. Then, all collision points a, b, c, d on the polygon intersecting with the extension of the direct connection are identified. The first collision point that is reached from A when going to B is a. Following the polygon segments in ascending order, the next collision point is b and all polygon segments between a and b in ascending order are identified as the group of polygon segments that can be circumnavigated by turning to the right (clockwise angle CW). The remaining polygon segments are identified as the group of polygon segments that may be circumnavigated by turning to the left (counter-clockwise angle CCW). For each polygon segment in the first group (CW), the respective node with the larger deviation angle is marked. In the example, for the segment n1-n2, n2 has a larger deviation angle and is marked. For the polygon segments with collision points (for example n21-n1), both nodes are marked. By marking the respective node for each polygon segment in a group, local extrema can be found as nodes with exactly 2 markings. In the example, n3 is a local extremum because n3 has a larger deviation angle than n2 and n4 and therefore is marked twice both for segment n2-n3 and n3-n4. Following this principle, n5 is also identified as local extremum. Comparing n3 and n5, n5 has the larger deviation angle and is therefore the global extremum. For the second group (CCW), the same procedure can be followed to identify n16 as local extremum. Since only one local extremum for that group exists, it automatically is also the global extremum. To further improve the performance of the marking process, for the second group all polygon segments between collision points b and c and between d and a in ascending order can be ignored, since the existence of the collision points c and d mean that the global extremum will have a deviation angle of greater than 180 degrees to the left.

FIG. 7 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, driving assistance systems or board computers of vehicles (e.g., vehicles 401, 402, 403, cf. FIG. 1) and other similar computing devices. For example, computing device 950 may be used as a frontend by a user to interact with the computing device 900. The components shown here, their connections and relationships, and their functions, are meant to be exemplary only, and are not meant to limit implementations of the embodiments described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Optionally it may include one or more graphical processing units (GPU). Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claim is:

1. A computer-implemented method for enabling parallel processing of determining collision-free paths for a vehicle to navigate from a start location to a target location, the method comprising:
   receiving representations of the start location (SL), the target location (TL) and receiving one or more polygonal representations (CO1, CO2, CO3) of one or more potential collision objects;
   initializing at least one representation of the vehicle, the at least one representation having the received start location (SL) as current location (CL), and further having a list of targets (LOT) comprising the received target location (TL) as most recent target location;
   iteratively constructing a graph of collision-free path segments by determining whether a collision object is located on a direct connection between the current location and the most recent target location in the list of targets, and repeating for each vehicle representation:
      if the direct connection is collision-free, saving the path segment as an edge of the graph, and selecting, for a next iteration, the most recent target location as new current location (CL) and removing the most recent target location from the list of targets;
      else, identifying a plurality of reachable nodes wherein the plurality of reachable nodes are based on local extrema on one or more polygonal representations intersecting with the direct connection, where local extrema are determined relative to a deviation angle to the left or to the right from the direct connection between the current location and the most recent target location, and, for the next iteration, generating from the representation a further representation of the vehicle for each identified node, the further representation having the same current location as the vehicle representation and having a list of targets comprising all elements of the vehicle representation's list of targets as well as the identified node as new most recent target location;
   until, the lists of targets associated with the existing vehicle representations are empty; and
   constructing collision-free paths based on collision-free path segments; and
   providing the collision-free paths to a path selector.

2. The method of claim 1, wherein identifying the plurality of reachable nodes further comprises:
   determining a first group of polygon segments of a particular polygonal representation which comprises the polygonal segments with the deviation angle to the left for circumventing a corresponding collision object, and determining a second group of polygon segments of the particular polygonal representation which comprises the polygonal segments with the deviation angle to the right for circumventing the corresponding collision object;
   for each determined polygon segment of the first group, independently marking the node having the higher value in the deviation angle to the left, and for each determined polygon segment of the second group, independently marking the node having the higher value in the deviation angle to the right; and
   identifying nodes with two marks as local extrema of the particular polygonal representation as potentially reachable nodes.

3. The method of claim 2, wherein identifying the plurality of reachable nodes further comprises:
   identifying nodes with the highest values in deviation angles to the right and to the left as global extrema of the particular polygonal representation and filtering out local extrema which are not global extrema.

4. The method of claim 2, wherein identifying the plurality of reachable nodes further comprises:
   filtering out local extrema of a particular polygonal representation which are hidden for the current location by one or more local extremum of a polygonal representation.

5. The method of claim 1, wherein identifying the plurality of reachable nodes further comprises:
   identifying nodes with the highest values in deviation angles to the right and to the left as global extrema of the particular polygonal representation and filtering out local extrema which are not global extrema; and
   filtering out local extrema of a particular polygonal representation which are hidden for the current location by one or more local extremum of a polygonal representation.

6. The method of claim 1, wherein identifying the plurality of reachable nodes based on local extrema is performed in parallel by a multi-processor device.

7. The method of claim 1, wherein constructing the graph further comprises one or more of the following performance based filtering steps:
   filtering local extrema by checking the admissibility of intermediate target locations; and
   deleting a particular vehicle representation if the particular vehicle representation can be judged to perform worse than a competing vehicle representation with regards to a respective goal function.

8. The method of claim 1, wherein the path selector applies one or more of the following post-processing activities to the constructed collision-free paths:
   smoothening of a path by using splines;
   further adding one or more waypoints along the path, wherein said way points represent entry or exit points to one or more areas of interest; and
   removing one or more waypoints from the path if a vehicle can move directly from a preceding to a succeeding waypoint.

9. The method of claim 1, further comprising:
   receiving, from the path selector, a selected collision-free path; and
   updating a control system of the vehicle with the selected collision-free path to adjust the moving direction of the vehicle according to the selected path.

10. The method of claim 1, wherein a particular polygonal representation of a particular potential collision object is associated with sensor data indicating the current position of the particular potential collision object.

11. The method of claim 1, wherein, when constructing the graph and the direct connection is collision-free, deleting the representation of the respective vehicle if the list of targets is empty.

12. A computer program product enabled for parallel processing to determine collision-free paths for a vehicle to navigate from a start location to a target location, the computer program product, when loaded into a memory of a computer system and executed by at least one processor of the computer system, performs the steps of:

receiving representations of the start location (SL), the target location (TL) and receiving one or more polygonal representations (CO1, CO2, CO3) of one or more potential collision objects;

initializing at least one representation of the vehicle, the at least one representation having the received start location (SL) as current location (CL), and further having a list of targets (LOT) comprising the received target location (TL) as most recent target location;

iteratively constructing a graph of collision-free path segments by determining whether a collision object is located on a direct connection between the current location and the most recent target location in the list of targets, and repeating for each vehicle representation:

if the direct connection is collision-free, saving the path segment as an edge of the graph, and selecting, for a next iteration, the most recent target location as new current location (CL) and removing the most recent target location from the list of targets;

else, identifying a plurality of reachable nodes wherein the plurality of reachable nodes are based on local extrema on one or more polygonal representations intersecting with the direct connection, where local extrema are determined relative to a deviation angle to the left or to the right from the direct connection between the current location and the most recent target location, and, for the next iteration, generating from the representation a further representation of the vehicle for each identified node, the further representation having the same current location as the vehicle representation and having a list of targets comprising all elements of the vehicle representation's list of targets as well as the identified node as new most recent target location;

until, the lists of targets associated with the existing vehicle representations are empty; and constructing collision-free paths based on collision-free path segments; and providing the collision-free paths to a path selector.

13. The computer program product of claim 12, wherein the at least one processor of the computer system is further operable to identify a plurality of reachable nodes by performing the further steps of:

determining a first group of polygon segments of a particular polygonal representation which comprises the polygonal segments with the deviation angle to the left for circumventing a corresponding collision object, and determining a second group of polygon segments of the particular polygonal representation which comprises the polygonal segments with the deviation angle to the right for circumventing the corresponding collision object;

for each determined polygon segment of the first group, independently marking the node having the higher value in the deviation angle to the left, and for each determined polygon segment of the second group, independently marking the node having the higher value in the deviation angle to the right; and identifying nodes with two marks as local extrema of the particular polygonal representation as potentially reachable nodes.

14. The computer program product of claim 13, wherein identifying the plurality of reachable nodes further comprises:

identifying nodes with the highest values in deviation angles to the right and to the left as global extrema of the particular polygonal representation and filtering out local extrema which are not global extrema.

15. A computer system for parallelized determination of collision-free paths for a vehicle to navigate from a start location to a target location, comprising:

an interface component configured to receive start and target location data and one or more polygonal representations of one or more potential collision objects;

an initialization component configured to initialize at least one representation of the vehicle, the at least one representation having the received start location as current location, and further having a list of targets comprising the received target location;

a graph generator configured to iteratively construct a graph of collision-free path segments by iteratively calling an extrema identifier module and a replicator module for each vehicle representation as long as the received target location is not reached, to determine whether a collision object is located on a direct connection between the current location and the most recent target location in the list of targets, wherein:

the graph generator is configured to save a corresponding path segment as an edge of the graph if the direct connection is collision-free, and is further configured to select, for the next iteration, the most recent target location as new current location and to remove the most recent target location from the list of targets;

the graph generator being further configured, if the direct connection is not collision-free, to call the extrema identifier for identifying a plurality of reachable nodes wherein the nodes are based on local extrema on one or more polygonal representations intersecting with the direct connection, where local extrema are determined relative to the deviation angle to the left or to the right from the direct connection between the current location and the most recent target location, and to call the replicator to generate, for the next iteration, from the representation a further representation of the vehicle for each identified node, the further representation having the same current location as the vehicle representation and having a list of targets comprising all elements of the vehicle representation's list of targets as well as the identified node as new most recent target location;

the graph generator further configured to construct collision-free paths based on collision-free path segments; and to provide the collision-free paths to a path selector.

16. The computer system of claim 15, wherein the extrema identifier is further configured to identify the plurality of reachable nodes by:

determining a first group of polygon segments of a particular polygonal representation which comprises the polygonal segments with the deviation angle to the left for circumventing the corresponding collision object, and determining a second group of polygon segments of the particular polygonal representation which comprises the polygonal segments with the deviation angle to the right for circumventing the corresponding collision object;

for each determined polygon segment of the first group, independently marking the node having the higher value in the deviation angle to the left, and for each determined polygon segment of the second group, independently marking the node having the higher value in the deviation angle to the right; and identifying nodes with two marks as local extrema of the particular polygonal representation as potentially reachable nodes.

17. The computer system of claim 15, wherein identifying the plurality of reachable nodes further comprises:

identifying nodes with the highest values in deviation angles to the right and to the left as global extrema of the particular polygonal representation and filtering out local extrema which are not global extrema.

18. The computer system of claim 15, wherein the extrema identifier is further configured to identify the plurality of reachable nodes by:

identifying the reachable nodes with the highest values in deviation angles to the right and to the left as global extrema of the particular polygonal representation; and obtaining the reachable nodes by filtering out the local extrema which are hidden for the current location by the particular polygonal representation.

19. The computer system of claim 15, wherein the computer system is a mobile device.

20. The computer system of claim 15, wherein, when constructing the graph and the direct connection is collision-free, deleting the representation of the respective vehicle if the list of targets is empty.

* * * * *